United States Patent

Momose et al.

[11] 4,080,613
[45] Mar. 21, 1978

[54] MOTOR DRIVING DEVICE FOR A CAMERA

[75] Inventors: Haruhiko Momose; Kunio Nakajima, both of Hachioji, Japan

[73] Assignee: Konishiroku Photo Industry Co., Ltd., Tokyo, Japan

[21] Appl. No.: 779,493

[22] Filed: Mar. 21, 1977

Related U.S. Application Data

[63] Continuation of Ser. No. 535,587, Dec. 23, 1974, abandoned.

[30] Foreign Application Priority Data

Dec. 28, 1973   Japan .............................. 48-144777

[51] Int. Cl.² ............................................ G03B 17/42
[52] U.S. Cl. ................................................ 354/204
[58] Field of Search ............... 354/170, 171, 172, 173, 354/204

[56] References Cited

U.S. PATENT DOCUMENTS 3,710,705   1/1973   Kimura ............................. 354/171
3,840,884   10/1974   Umeda ............................. 354/204

FOREIGN PATENT DOCUMENTS 2,461,666   10/1975   Germany.

Primary Examiner—L. T. Hix
Assistant Examiner—M. L. Gellner
Attorney, Agent, or Firm—Bierman & Bierman

[57] ABSTRACT

A motor driving device for a camera is provided in which the motor is placed in an energizing circuit which includes a governor. A switch is provided in parallel with the governor and is adapted to be operated by a relay. When the switch is opened, the governor can effectively control the speed of the motor in order to prevent overrunning of the film during the winding operation. When the switch is closed, the governor is short-circuited and the motor can run to wind the film or control exposure.

1 Claim, 1 Drawing Figure

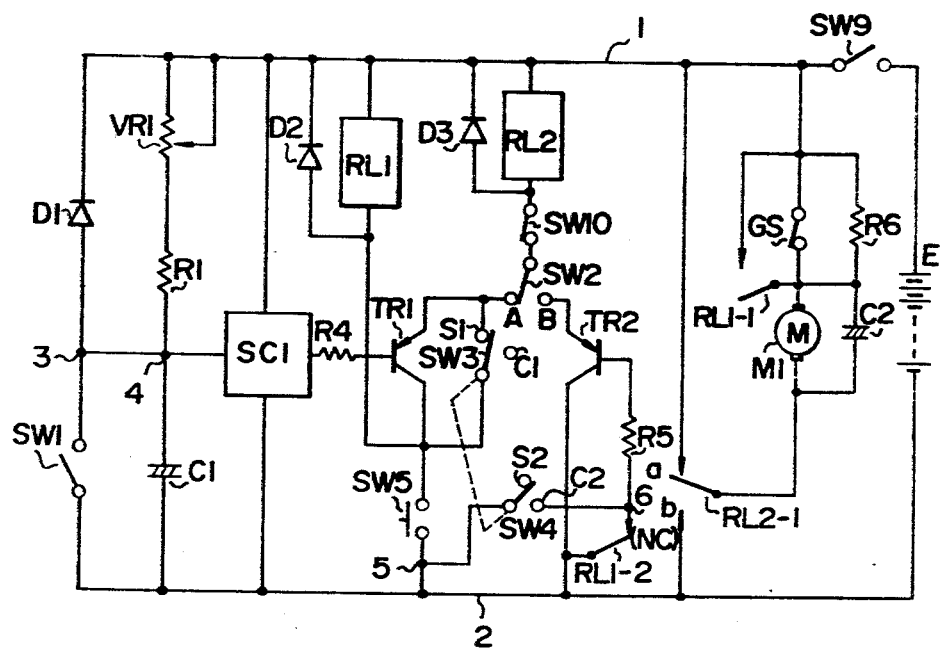

MOTOR DRIVING DEVICE FOR A CAMERA

This application is a continuation of Application Ser. No. 535,587 filed Dec. 23, 1974, now abandoned, and which claims the priority of Japanese Pat. No. 144777/1973, filed Dec. 28, 1973.

This invention relates to an improvement of a motor driving device for a camera.

So far, if rotation speed of a motor of the motor driving device is elevated in order to heighten speed of successive photographing, overrunning is apt to occur when a finger is removed from the release button in an attempt to stop photographing because of quick reduction of load to the motor when winding-up of a film is finished. Therefore, in ordinary motor driving devices of a camera with a film of Leika size, the successive photographing speed has been limited to about 5 to 6 frames per second.

Therefore, an object of the present invention is to provide a motor driving device for a camera free from the abovementioned deficiencies.

This object is accomplished by a motor driving device provided with a governor for a motor and means for rendering said governor inoperative while said motor winds the film and operative at the time of the end of film winding. According to an embodiment of the present invention, said means is actuated in connection with release operation, wherein said governor is rendered operative only when the release operation is not effected.

The invention is illustrated below in detail with reference to the embodiment shown in a drawing.

A drawing shows an electric circuit of an embodiment of the present invention.

In the drawing, E represents a power supply, 1 represents a positive bus, 2 is a negative bus, SW 9 is a power-supply switch on the positive bus 1. Across the positive bus 1 and the negative bus 2 are connected a diode D 1, a trigger switch SW 1, a rheostat VR 1 for determining time constant such as a slidable resistor, a fixed resistance R 1 such as protector resistance, a capacitor C 1 for determining time constant and a switching circuit SC 1. Middle points 3 and 4 are connected to each other and connected to the input side of the switching circuit SC 1. The output side of the switching circuit SC 1 is connected to the base of a pnp type transistor TR 1 via a fixed resistance R 4 that serves as a protector resistance. The collector of the transistor TR 1 is connected to the negative bus 2 via a release switch SW 5 that is actuated by the camera release button. Between the positive bus 1 and a release switch SW 5 are connected a diode D 2 and a winding control relay RL 1 in parallel. The emitter of the transistor TR1 to which is connected the collector via a switch SW 3 for selection of single frame and successive photographing, is connected to a contact A which is linked to the moving piece of a timing switch SW 2, and the other contact B is connected to the emitter of the pnp type transistor TR 2 of which collector is connected to the negative bus 2 and of which base is connected to said collector via a normally-closed switch RL1-2 which is opened by the relay RL 1 and a resistance R 5. The moving piece of the timing switch SW 2 is connected to a switch SW 10 which is actuated by a diaphragm mechanism (not shown). Between the switch SW 10 and the positive bus 1 are connected a diode D3 and a relay RL 2 in parallel. Also, a middle point 5 between a release switch SW 5 that is interlocked to the camera release button and the negative bus 2 is connected to said switch SW 3 for selection of single frame and successive photographing and is connected to the middle point 6 between the resistance R 5 and the relay switch RL1-2 via a switch SW 4 for selection of single frame and successive photographing which switch has contacts s 2 and c 2 which correspond to the contact s 1 for single frame photographing and contact c 1 for successive photographing. M is a motor for effecting shutter releasing, film winding and so forth.

Then an input side of a motor M is connected to the positive bus 1 via a normally-open release switch RL1-1 (closed while the relay RL 1 is operated), a governor switch GS and a fixed resistance R 6 that are connected in parallel, and the other input side of the motor is connected to the moving piece of the relay switch RL2-1 that is actuated by the relay RL 2. Between said other input side and the fixed resistance R 6 is connected a capacitor C 2, and one contact a of the moving piece of said relay switch RL2-1 is connected to the positive bus 1 and the other contact b is connected to the negative bus 2.

In the state mentioned above and shown in the drawing, the power-switch SW 9 is open, the film has been wound for single frame photographing, moving pieces of the switches SW 3 and SW 4 are on the side of contacts s1 and s2 for single frame photographing and thus the device is ready to be released at any moment.

If now the power-supply switch SW 9 is turned on, and the release button which is not shown is pressed to turn on the release switch SW 5 linked thereto, the winding control relay RL 1 is actuated; the relay switch RL 1-1 is closed to be in parallel with the governor switch GS of the motor M. While the release button is being pushed to take pictures, the governor of the motor M is not worked in order that the motor M rotates at a maximum speed. If a finger is removed from the release button to stop picture taking and if the release switch SW 5 is turned off, the relay switch RL1-1 is then opened; the governor of the motor M is worked to render the speed of the motor M constant.

While the aforesaid motor M is rotating, the known release mechanism which is not shown actuates a shutter (not shown) to effect exposure of the film, by said rotation, and at the same time, the switch SW 10 is turned off by the diaphragm mechanism which is not shown, rendering the relay RL 2 to be inoperative. The moving piece of the relay switch RL2-1 is then changed from the side of contact b to contact a; brake is applied to the motor M to stop it.

In this way, as the switch SW 10 turns off, the moving piece of the timing switch SW 2 is changed from the side of contact A to contact B by means of a known lever which is not shown. Exposure is performed while the moving piece of the timing switch SW 2 is on the side of contact A, and film is wound while the moving piece is on the side of contact B as described below.

Then as the exposure is finished, the switch SW 10 is then turned on again. But while the release button is being pushed, the release switch RL1-2 remains turned off; no base current flows to the transistor TR 2. The transistor TR 2 is non-conductive, the relay RL 2 does not function, and the motor M remains at rest.

If now a finger is removed from the release button, the relay switch RL1-2 is turned on rendering the transistor TR 2 to be conductive. The relay RL 2 is then actuated and moves the moving piece of the relay switch RL2-1 toward the side of contact b. And as the motor M is turned to wind the film by one frame, the moving piece of the timing switch SW 2 is changed to the side of contact A. Release switch SW 5 remains turned off even if the moving piece of the timing switch SW 2 is changed to the side of contact A, and, therefore, the relay RL 2 does not work and the motor remains at rest being ready for release.

In the case of successive photographing, the moving pieces of the switches SW 3 and SW 4 are changed from the state shown toward the side of c 1 and c 2 for successive photographing.

Then the power-supply switch SW 9 and the release switch SW 5 interlocked to the release button are turned on, the release switch RL1-1 is closed by the relay RL 1 and is connected in parallel with the governor switch GS of the motor M so that the governor switch GS is short-circuited during the release operation by means of the relay switch RL1-1. And after the capacitor C 1 for determining the time constant is charged fully, the switching circuit SC 1 assumes the operative state and causes the transistor TR 1 to be conductive. Collector current then flows into the transistor TR 1 and causes the relay RL 2 to operate. Therefore, while the release button is pushed to take pictures, or in other words, while the release switch SW 5 is turned on, the governing effect on the motor M is nullified, permitting the motor M to rotate at a maximum speed. If a finger is removed from the release button in order to stop picture taking, the release switch RL1-1 is opened; governor for the motor M is functioned to maintain the speed of the motor M at constant.

As will be apparent from the foregoing description, according to the motor driving device for cameras of this invention, the governor is functioned or does not function in response to the release operation. While the governor is functioning, if the motor driving device is so set as will not invite overrunning, there will occur no overrunning when the picture taking is stopped even at the time of maximum speed of successive photographing.

In the embodiment mentioned above, a release switch only was employed as a switch to short-circuit the governor switch. But it should be understood that such a release switch may be replaced by the switch interlocked to the release operation or by a semiconductor switch. Moreover, it should be understood that the present invention is also applicable to the motor drive devices which employ electronic governor, etc.

What is claimed is:

1. In a camera control system comprising a motor for releasing a shutter and winding the film, and switching means for controlling the shutter-release and winding operations by said motor, the improvement comprising a motor-operated governor including a normally closed switch opened when said governor exceeds a predetermined speed, a resistor connected across the terminals of said normally closed switch, a source of power, and means connecting said motor to said source of power to energize said motor for the shutter-release and winding operations, said last means including a normally open shutter-release switch, a relay energizable upon closure of said release switch, and a normally open switch operated by said relay and connected in shunt with said normally closed governor controlled switch, whereby upon closure of said shutter-release switch the operation of said governor is neutralized, and the motor operates at maximum speed during the picture-taking operation, but at controlled speed during the film-winding operation.

* * * * *